(12) United States Patent
Potkonjak

(10) Patent No.: US 8,667,109 B2
(45) Date of Patent: Mar. 4, 2014

(54) USER PROFILE-BASED WIRELESS DEVICE SYSTEM LEVEL MANAGEMENT

(75) Inventor: Miodrag Potkonjak, Los Angeles, CA (US)

(73) Assignee: Empire Technology Development LLC, Wilmington, DE (US)

( * ) Notice: Subject to any disclaimer, the term of this patent is extended or adjusted under 35 U.S.C. 154(b) by 185 days.

(21) Appl. No.: 12/433,700

(22) Filed: Apr. 30, 2009

(65) Prior Publication Data

US 2010/0278119 A1    Nov. 4, 2010

(51) Int. Cl.
G06F 15/173    (2006.01)

(52) U.S. Cl.
USPC ............................. 709/223; 709/203; 709/217

(58) Field of Classification Search
USPC .................. 709/203, 217, 219, 220, 223, 224
See application file for complete search history.

(56) References Cited

U.S. PATENT DOCUMENTS

| | | | |
|---|---|---|---|
| 7,743,344 B2 * | 6/2010 | Zervas et al. ................. | 715/854 |
| 7,890,581 B2 * | 2/2011 | Rao et al. ...................... | 709/204 |
| 8,032,472 B2 * | 10/2011 | Tsui et al. ....................... | 706/46 |
| 8,108,406 B2 * | 1/2012 | Kenedy et al. ................. | 707/749 |
| 8,200,371 B2 * | 6/2012 | Weyland ........................ | 700/291 |
| 8,209,275 B2 * | 6/2012 | Tsui et al. ....................... | 706/45 |
| 2003/0064744 A1 * | 4/2003 | Zhang et al. ................... | 455/522 |
| 2005/0079886 A1 * | 4/2005 | Niwano ......................... | 455/522 |
| 2005/0246639 A1 * | 11/2005 | Zellner et al. ................. | 715/708 |
| 2006/0156209 A1 * | 7/2006 | Matsuura et al. ............. | 714/798 |
| 2006/0184287 A1 * | 8/2006 | Belady et al. ................. | 700/291 |
| 2006/0198359 A1 | 9/2006 | Fok et al. | |
| 2006/0277271 A1 | 12/2006 | Morse et al. | |
| 2006/0288241 A1 * | 12/2006 | Felter et al. ................... | 713/300 |
| 2007/0008927 A1 * | 1/2007 | Herz et al. ..................... | 370/331 |
| 2007/0206572 A1 * | 9/2007 | Silver et al. ................... | 370/352 |
| 2007/0271011 A1 * | 11/2007 | Lee et al. ........................ | 701/25 |
| 2008/0057894 A1 * | 3/2008 | Aleksic et al. ............. | 455/187.1 |

(Continued)

FOREIGN PATENT DOCUMENTS

| JP | 2000-092152 A | 3/2000 |
|---|---|---|
| JP | 2000-115730 A | 4/2000 |

(Continued)

OTHER PUBLICATIONS

International Search Report and Written Opinion, issued in International Application No. PCT/US2010/032999, mailed Aug. 16, 2010, 9 pages.

(Continued)

*Primary Examiner* — Lashonda Jacobs
(74) *Attorney, Agent, or Firm* — Brundidge & Stanger, P.C.

(57) ABSTRACT

Techniques for user profile-based system level management (SLM) and creation of system level agreements of a wireless device are generally disclosed. In some examples, a predictor may be provided to predict a future task to be performed by a wireless device, including resource requirements, based at least in part on a profile of a user and at least one of a profile of a communication partner the user, an operational recommendation, a performance model or a current state. An optimizer/analyzer may be provided to generate a plurality of instructions to configure the wireless device, based at least in part on the predicted future task and resource requirement, and a quality of service requirement of the wireless device, in anticipation of having to perform the predicted task. In various examples, the predictor and the optimizer/analyzer may form a local or a remotely disposed system level manager.

27 Claims, 10 Drawing Sheets

(56) References Cited

U.S. PATENT DOCUMENTS

| | | | |
|---|---|---|---|
| 2008/0071713 A1* | 3/2008 | Tung | 706/21 |
| 2008/0139112 A1 | 6/2008 | Sampath et al. | |
| 2008/0201386 A1 | 8/2008 | Maharajh et al. | |
| 2008/0249969 A1* | 10/2008 | Tsui et al. | 706/46 |
| 2009/0011740 A1 | 1/2009 | Aggarwal et al. | |
| 2009/0150004 A1* | 6/2009 | Wang et al. | 700/286 |
| 2010/0093331 A1* | 4/2010 | Rooks et al. | 455/418 |
| 2010/0172276 A1* | 7/2010 | Aragon | 370/311 |
| 2010/0322124 A1* | 12/2010 | Luoma et al. | 370/311 |
| 2010/0332043 A1* | 12/2010 | Weyland | 700/291 |
| 2012/0023226 A1* | 1/2012 | Petersen et al. | 709/224 |
| 2013/0210493 A1* | 8/2013 | Tal et al. | 455/566 |

FOREIGN PATENT DOCUMENTS

| | | |
|---|---|---|
| JP | 2001-045453 A | 2/2001 |
| JP | 2005-150816 A | 6/2005 |
| JP | 2005-151191 A | 6/2005 |
| JP | 2006-268217 A | 10/2006 |
| JP | 2008-125114 A | 5/2008 |
| JP | 2008-186305 A | 8/2008 |
| JP | 2008-532441 A | 8/2008 |

OTHER PUBLICATIONS

Bell et al., "Yesterday's Tomorrows: Notes on Ubiquitous Computing's Dominant Vision," Pers Ubiquit Comput, Nov. 2006, pp. 133-143.

Cerpa et al., "Statistical Model of Lossy Links in Wireless Sensor Networks," Proceedings of the Fourth International Symposium on Information Processing in Sensor Networks, Apr. 2005, pp. 81-88.

Cerpa et al., "Temporal Properties of Low Power Wireless Links: Modeling and Implications on Multi-Hop Routing," Sixth ACM International Symposium on Mobile Ad Hoc Networking and Computing, 05-5005, pp. 414-425.

Cole et al., "Designing Mobile Technologies to Support Co-Present Collaboration," Pers Ubiquit Comput, Nov. 2003, pp. 365-371.

Fishkin, "A Taxonomy for and Analysis of Tangible Interfaces," Pers Ubiquit Comput, Nov. 2004, pp. 347-358.

Kirovski et al., "Engineering Change Protocols for Behavioral and System Synthesis," IEEE Transactions on Computer-Aided Design of Integrated Circuits and Systems, Aug. 2005, vol. 24, No. 8, pp. 1145-1155.

Moshnyaga et al., "Handheld System Energy Reduction by OS-Driven Refresh," International Workshop on Power and Timing Modeling, Optimization and Simulation, Sep. 2006, pp. 24-35.

Oulasvirta et al., "A Cognitive Meta-Analysis of Design Approaches to Interruptions in Intelligent Environments," Conference on Human Factors in Computing Systems, Apr. 2004, pp. 1155-1158.

Oulasvirta et al., "Mobile Kits and Laptop Trays: Managing Multiple Devices in Mobile Information Work," Conference on Human Factors in Computing Systems, Apr. 2007, pp. 1127-1136.

Shoham, "Agent-Oriented Programming," Journal of Artificial Intelligence, Mar. 1993, vol. 60, No. 1, pp. 51-92.

Weiser, "Creating the Invisible Interface," Seventh Annual Symposium on User Interface Software and Technology (Invited talk), Nov. 1994.

Wong et al., "Power Minimization in QoS Sensitive Systems," IEEE Transactions on Very Large Scale Integration (VSLI) Systems, Jun. 2004, vol. 12, No. 6, pp. 553-561.

International Preliminary Report on Patentability, issued in International Application No. PCT/US2010/032999, mailed Nov. 10, 2011, 4 pages.

* cited by examiner

1000 A computer program product

1032 Computer Readable Storage Medium

1034 Programming instructions configured to perform at least one of:

receiving a user profile, a communication partner profile, a recommendation, a performance model and/or a current system status for a wireless device;
    predicting a future task including resource requirement for the wireless device, based at least in part on the user profile, and at least one of the received communication partner profile, a recommendation, a performance model and/or a current system status for a wireless device;
    generating a plurality of instructions to configure the wireless device to perform the future task based at least in part on the resource requirement and a quality of service requirement; and/or
    conveying or performing the instructions.

Figure 10

USER PROFILE-BASED WIRELESS DEVICE SYSTEM LEVEL MANAGEMENT

BACKGROUND

Wireless communication networks are becoming increasingly popular these days. A typical wireless network may include plurality of wireless devices. Many wireless devices are increasingly configured with a variety of sensors such as camera, camcorder, GPS, compass, and thermometers. Traditionally, wireless devices employ operating systems that are not customized to the requirements and preferences of their users, environment and specific characteristics of the device, available resources, likely applications and workload, and so forth. Current approach to operating and management wireless devices may no longer be viable as the functions and complexities of the wireless devices continue to increase.

BRIEF DESCRIPTION OF THE DRAWINGS

Subject matter is particularly pointed out and distinctly claimed in the concluding portion of the specification. The foregoing and other features of the present disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings:

FIG. 10 illustrates a block diagram of an example article of manufacture having a computer program product for user profile-based SLM, in accordance with various embodiments of the present disclosure.

DETAILED DESCRIPTION OF EMBODIMENTS OF THE DISCLOSURE

Figure 1:
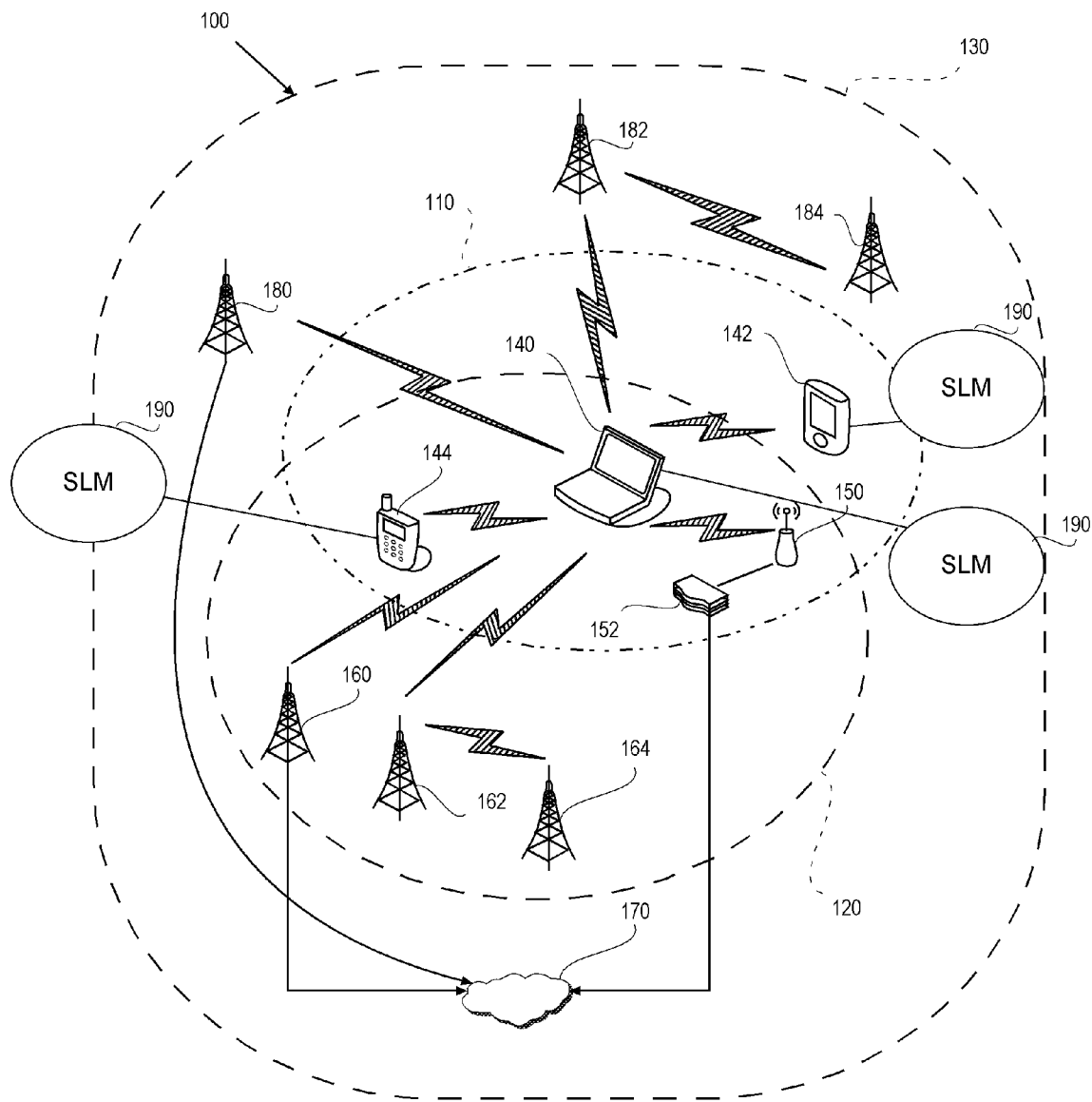
FIG. 1 schematically illustrates an example wireless communication system, in accordance with various embodiments of the present disclosure.

The following description sets forth various examples along with specific details to provide a thorough understanding of claimed subject matter. It will be understood by those skilled in the art, however, that claimed subject matter may be practiced without some or more of the specific details disclosed herein. Further, in some circumstances, well-known methods, procedures, systems, components and/or circuits have not been described in detail in order to avoid unnecessarily obscuring claimed subject matter. In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the Figures, may be arranged, substituted, combined, and designed in a wide variety of different configurations, all of which are explicitly contemplated and make part of this disclosure.

In the following description, algorithms and/or symbolic representations of operations on data bits and/or binary digital signals stored within a computing system, such as within a computer and/or computing system memory may be presented. An algorithm is generally considered to be a self-consistent sequence of operations and/or similar processing leading to a desired result where the operations may involve physical manipulations of physical quantities that may take the form of electrical, magnetic and/or electromagnetic signals capable of being stored, transferred, combined, compared and/or otherwise manipulated. In various contexts such signals may be referred to as bits, data, values, elements, symbols, characters, terms, numbers, numerals, etc. Those skilled in the art will recognize, however, that such terms may be used to connote physical quantities. Hence, when terms such as "storing", "processing", "retrieving", "calculating", "determining" etc. are used in this description they may refer to the actions of a computing platform, such as a computer or a similar electronic computing device such as a cellular telephone, that manipulates and/or transforms data represented as physical quantities including electronic and/or magnetic quantities within the computing platform's processors, memories, registers, etc This disclosure is drawn, inter alia, to methods, apparatus, and systems related to user profile-based system level management of a wireless device. The wireless device may be a next generation wireless device, which may be highly complex, providing ultra wide bandwidth, but requiring high power budget wireless radios such as MIMO, cognitive, and/or ultra wide bandwidth transceivers. Further, the wireless device may communicate with human body embedded devices such pacemakers, portable kidneys and so forth.

Embodiments of the present disclosure combine coordinated development and deployment of models, prediction tools, optimization techniques, and decision procedures that permit relatively efficient use of permanent (e.g. storage), perishable (computing cycles), and/or renewable (e.g. energy) resources so that user specified objective function under a given set of constraints for a wireless device is optimized. In various embodiments, the present disclosure includes long and short terms modeling of the user, his/her communication partners, software and hardware of the devices, operational conditions and environment, energy supply, and other relevant predictors. In various embodiments, predictions from the data of same modality and/or conditional multimodal models may be utilized. In various embodiments, the models may be created in a manner that they facilitate consequent optimization.

In various embodiments, the present disclosure may be practiced with on-line or off-line customization of how and when individual tasks of the wireless device is invoked and executed. In various embodiments, the profiles of the user, the available resources, the quality of links at certain time and place, and likely traffic, and computational and sensing tasks may be used to decide where the task will be executed using which computation resources and which supply voltage.

In various embodiments, the present disclosure may be realized through system-level management (SLM), local or remote, operating on top of the existing operating system of a wireless device. In alternate embodiments, the present disclosure may be realized through employment of parameterized operating systems for a wireless device. Models and predictions for wireless device users behavior and preference, applications (e.g. communication traffic and sensing tasks), the available resources (e.g. energy) and operational environment (e.g. quality of wireless links) may be heuristic, parametric statistical or data-driven. The prediction techniques may be machine learning or Monte Carlo simulations. And, a user interface may be provided for preferences overwriting.

The terms "predictor," "optimizer," "analyzer," "system level manager," "organizer," "filter," and "profiler" refer to respective hardware and/or software implementing entities, and does not include a human being. The operations performed by the "predictor" et al are operations performed by the respective hardware and/or software implementations, e.g. operations that transform data representative of real things from one state to another state, and these operations do not include mental operations performed by a human being.

FIG. 1 schematically illustrates an example wireless communication system, in accordance with various embodiments of the present disclosure. Wireless communication system 100 may include one or more wireless communication networks, generally shown as 110, 120 and 130. In particular, the wireless communication system 100 may include a wireless local area network (WLAN) 110, a wireless metropolitan area network (WMAN) 120 and a wireless wide area network (WWAN) 130. Although FIG. 1 depicts three wireless communication networks, the wireless communication system 100 may include additional or fewer wireless communication networks. For example, the wireless communication system 100 may include more or less WLANs, WMANs and/or WWANs. The methods and apparatus described herein are not limited in this regard.

The wireless communication system 100 may also include one or more mobile stations, also referred to as subscriber stations, generally shown as 140, 142 and 144. For example, the subscriber stations 140, 142 and 144 may include wireless electronic devices such as a desktop computer, a laptop computer, a handheld computer, a tablet computer (e.g., personal digital assistant (PDA)), a cellular telephone, a pager, an audio and/or video player (e.g., an MP3 player or a DVD player), a gaming device, a video camera, a digital camera, a navigation device (e.g., a global positioning satellite (GPS) device), a wireless peripheral (e.g., a printer, a scanner, a headset, a keyboard, a mouse, etc.), a medical device (e.g., a heart rate monitor, a blood pressure monitor, etc.), and/or other suitable fixed, portable, or mobile electronic devices. Although FIG. 1 depicts three subscriber stations 140, 142 and 144, the wireless communication system 100 may include more or less subscriber stations.

Typically, each of the subscriber stations 140, 142 and 144 may include a number of hardware and software resources, such as processor cycles, memory space, storage, networking bandwidth, applications and so forth, and an operating system configured to manage the resources, including allocating the resources for various tasks performed on the wireless device. For various resources, the operating system may manage their use and allocation via various policies and/or parameters, e.g. processor cycle time, memory space sizes, cache sizes, networking protocols and so forth.

The subscriber stations 140, 142 and 144 may use a variety of access schemes such as, for example, orthogonal frequency-division multiple access (OFDMA), spread spectrum schemes (e.g., direct sequence code division multiple access (DS-CDMA) and/or frequency hopping code division multiple access (FH-CDMA)), time-division multiple access (TDMA), frequency-division multiplexing access (FDMA) and/or other suitable access schemes to communicate via wireless links.

In one example, the subscriber stations 140, 142 and 144 may use a direct sequence spread spectrum (DSSS) scheme and/or frequency hopping spread spectrum (FHSS) scheme to implement the WLAN 110 (e.g., modulations in accordance with any one of a number of industry standards developed by various standard and/or industry organizations, such as, the Institute of Electrical and Electronic Engineers (IEEE)). For example, the laptop computer 140 may communicate with devices associated with the WLAN 110 such as the handheld computer 142 and/or the cellular phone 144 via wireless links. The laptop computer 140 may also communicate with an access point (AP) 150 via a wireless link. Generally, WLANs and WMANs include multiple APs 150. The AP 150 may be operatively coupled to a router 152 as described in further detail below. Alternatively, the AP 150 and the router 152 may be integrated into a single device (e.g., a wireless router).

The subscriber stations 140, 142 and 144 may use OFDMA to transmit large amounts of digital data by splitting a radio frequency signal into multiple small sub-signals, which in turn, may be transmitted simultaneously at different frequencies. In particular, the subscriber stations 140, 142 and 144 may use OFDMA to implement the WMAN 120. For example, the subscriber stations 140, 142 and 144 may operate in accordance with the 802.16 family of standards developed by IEEE to provide for fixed, portable, and/or mobile broadband wireless access (BWA) networks (e.g., the IEEE std. 802.16, published by IEEE 2004) to communicate with base stations, generally shown as 160, 162, and 164, via wireless link(s).

Although some of the above examples are described with respect to standards developed by IEEE, the methods and apparatus disclosed herein are readily applicable to many specifications and/or standards developed by other special interest groups and/or standard development organizations (e.g., Wireless Fidelity (Wi-Fi) Alliance, Worldwide Interoperability for Microwave Access (WiMAX) Forum, Infrared Data Association (IrDA), Third Generation Partnership Project (3GPP, 3GPP2), etc.). For example, long term evolution (LTE, a 3GPP standard), air interface evolution (a 3GPP2 standard) are suitable standards for applicability with regard to various embodiments of the present disclosure in addition to IEEE 802.16 and WiMAX standards. The methods and apparatus described herein are not limited in this regard. Additionally, the subscriber stations 140, 142 and 144 may operate in accordance with other wireless communication protocols to support the WWAN 130. In particular, these wireless communication protocols may be based on analog, digital, and/or dual-mode communication system technologies such as, for example, Global System for Mobile Communications (GSM) technology, Wideband Code Division Multiple Access (WCDMA) technology, General Packet Radio Services (GPRS) technology, Enhanced Data GSM Environment (EDGE) technology, Universal Mobile Telecommunications System (UMTS) technology, standards based on these technologies, variations and evolutions of these standards, and/or other suitable wireless communication standards.

The WLAN 110, WMAN 120 and WWAN 130 may be operatively coupled to a common public or private network 170 such as the Internet, a telephone network (e.g., public switched telephone network (PSTN)), a local area network (LAN), a cable network, and/or another wireless network via connection to an Ethernet, a digital subscriber line (DSL), a telephone line, a coaxial cable, and/or any wireless connection, etc. In one example, the WLAN 110 may be operatively coupled to the common public or private network 170 via an AP 150 and/or the router 152. In another example, the WMAN 120 may be operatively coupled to the common public or private network 170 via the base station(s) 160, 162, and/or 164. In another example, the WWAN 130 may be operatively coupled to the common public or private network 170 via base station(s) 180, 182 and/or 184.

The wireless communication system 100 may include other WLAN, WMAN, and/or WWAN devices (not shown) such as network interface devices and peripherals (e.g., network interface cards (NICs)), access points (APs), redistribution points, end points, gateways, bridges, hubs, etc. to implement a cellular telephone system, a satellite system, a personal communication system (PCS), a two-way radio system, a one-way pager system, a two-way pager system, a personal computer (PC) system, a personal data assistant (PDA) system, a personal computing accessory (PCA) system, and/or any other suitable communication system. Although certain examples have been described above, the scope of coverage of this disclosure is not limited thereto.

The efficient operation of wireless electronic devices within a system such as system 100 may become increasingly difficulty due to complex interaction of hardware, software, applications, operational and environmental conditions. Almost all of these entities have numerous options that greatly impact the effective use of a wireless device. For example, high temperature may double or triple energy consumption, and high energy consumption may rapidly additionally increase the temperature of a wireless device. However, the energy consumption may be impacted by many other issues, including the allocated time for the task, cache line policy, used scheduled algorithm, the quality of communication links, and/or used bandwidth.

Therefore, in accordance with various embodiments of the present disclosure, a system level manager (SLM) 190 may be provided to individual portable electronic wireless devices, such as may be illustrated by subscriber stations 140, 142, and 144 (hereinafter, simply wireless devices). In various embodiments, individual SLMs 190 may comprise a predictor and an optimizer/analyzer operatively coupled to each other. In various embodiments, the predictor may be configured to predict a future task to be performed by a wireless device, including resource requirement for performing the future task by the wireless device, based at least in part on a profile of a user of the wireless device and at least one of a profile of a communication partner the user, an operational recommendation for the wireless device, a performance model of the wireless device and/or a current state of the wireless device. The optimizer/analyzer may be configured to generate a plurality of instructions to configure the wireless device, based at least in part on the predicted future task and resource requirement for performing the future task and a quality of service requirement of the wireless device, in anticipation of the wireless device having to perform the predicted task.

In various embodiments, on determination of the instructions, individual SLMs 190 may convey to the operating system the management action to be taken. The process may be repeated periodically, or performed continuously by SLM 190, to allow the performance of the wireless device to be managed periodically or continuously to achieve the quality of service requirements, as required.

In accordance with various embodiments, an SLM 190 may be generic for one type of wireless device (e.g. a particular type of cell phone or a particular type and/or configuration of a laptop computer), or may target a specific device that may be unique due to software customization or due to hardware factors such as manufacturing variability and aging of device components. It may target both devices that allocate their resources using standard or real-time operating systems.

In alternate embodiments, some or all aspects of SLM 190 may be integrated with the operating system of that wireless device. In still other embodiments, SLM 190 may be disposed on a remote computing device (not shown) instead. The remotely disposed SLM 190 may remotely manage one or more wireless devices in the network.

In various embodiments, the operating system of wireless devices 140, 142, and 144 may be configured to provide measurements for various task, hardware and/or software related metrics, e.g. processor cycle time, cache hit, packet error rate and so forth. In various embodiments, wireless devices 140, 142, and 144 may be configured with sensors to measure and to provide measurements for various user and/or device related metrics, e.g. temperature sensors, user biometric sensors and so forth. In various embodiments, communication system 100 may be configured with sensors to measure and/or repositories to store, and to provide measurements for various environment related metrics, e.g. ambient temperature and/or humidity, network traffic bandwidth and/or error rates. In various embodiments, these sensors or data collection units may be configured to take real time measurements, and/or take measurements continuously or periodically. SLM 190 may utilize these device and/or system capabilities in obtaining the measurements.

Figure 2:
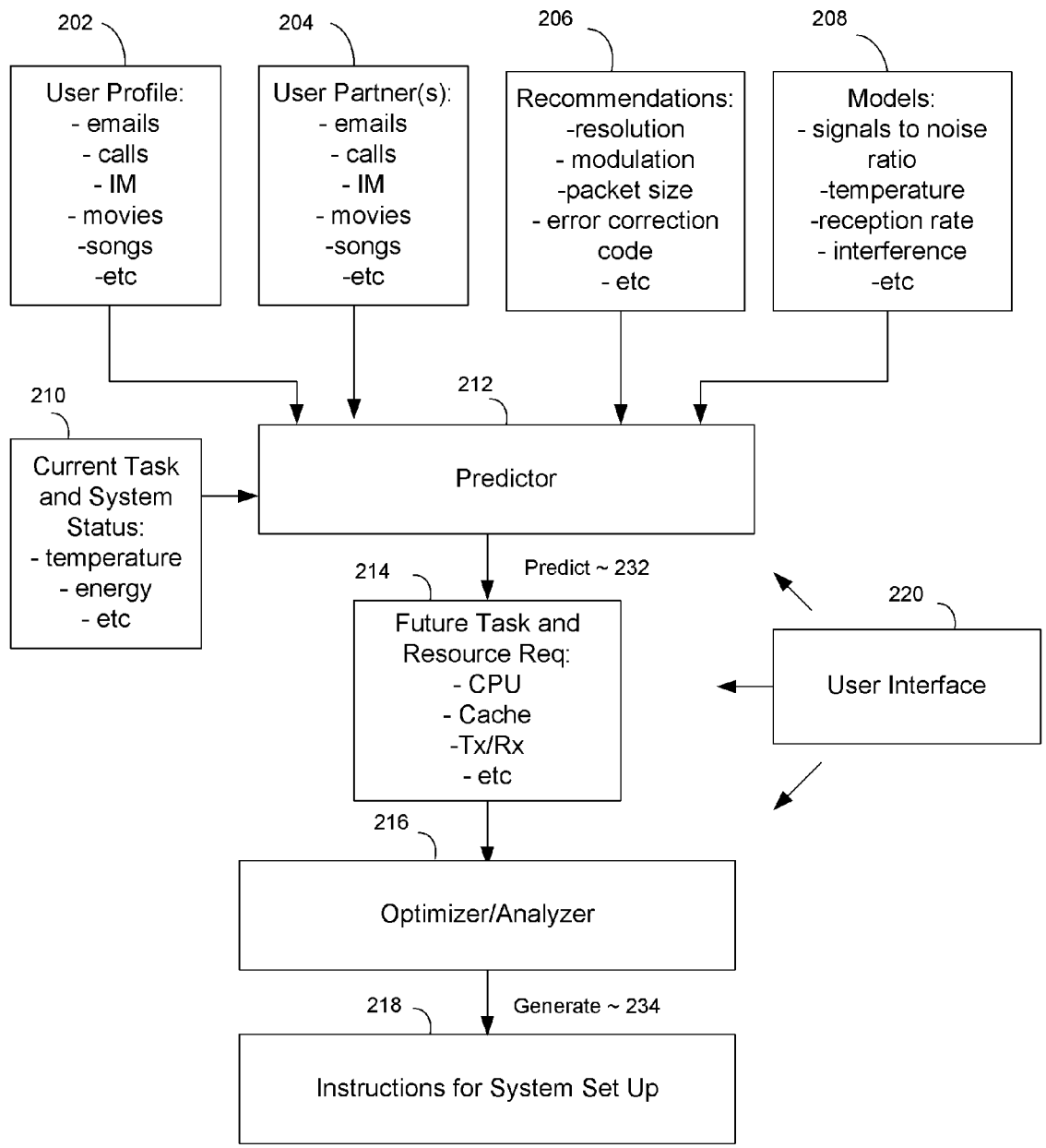
FIG. 2 schematically illustrates user profile-based system level management (SLM), in accordance with various embodiments of the present disclosure.

FIG. 2 schematically illustrates user profile-based system level management (SLM), in accordance with various embodiments of the present disclosure. Optimization under uncertainty may be much more difficult and less effective than one where the future actions may be at least partially known. For example, majority of on-line algorithms for majority of combinatorial and continuous optimization problems may be significantly inferior to the algorithms that assume complete knowledge about the pertinent problem instance. Some operating systems exactly operate in one such scenario. For example, such operating systems may modify the operating voltage without knowing either the status of the battery or pending tasks in near future. The present disclosure addresses these disadvantages through a user profile-based system level management (SLM) approach that may profile a user of a wireless device, the user's communicating partners, and environment (e.g. reception rate of links) in such a way that they facilitate prediction and management of the pending resource requirements and supply of resources, such as energy.

As illustrated, for one or more embodiments, predictor 212 may be provided and configured to predict 232 a future task 214 to be performed by a wireless device, including resource requirement for performing the future task by the wireless device. For one or more embodiments, predictor 212 may make a prediction based at least in part on a profile 202 of a user of the wireless device, and at least one of a profile 204 of a communication partner of the user, an operational recommendation 206 for the wireless device, a performance model 208 of the wireless device and/or a current status 210 of the wireless device. Note that some of the communication partners may be service providers, e.g. email service providers, telephony service providers, instant messaging service providers, movie or music distributors. Further, optimizer/analyzer 216 may be provided and configured to generate 234 a plurality of instructions 218 to configure the wireless device, based at least in part on the predicted future task 214 and resource requirement for performing the future task and a quality of service requirement of the wireless device, in anticipation of the wireless device having to perform the predicted task.

Profiles 202 and 204 may contain information about the habits and preferences of the user and his/her communication partners, in terms of the invoked tasks and their properties. For example, profiles 202 and 204 may have information about the send and received emails, voice calls, instant messages, invoked games, accessed web sites, downloaded movies/music, as well as the accepted and favored quality of service in terms of latency, throughput, resolution, security, and privacy. Profiles 202 and 204 may also contain the information about battery recharging patterns. The information may be abstracted to statistical models and typical patterns that may be either frequency-based or formulated in terms conditional probabilities. Thus, profiles 202 and 204 may contain statistical, probabilistic, and heuristic information about the probability that a particular task will be initiated or terminated at a particular moment or a particular scenario. For example, profiles 202 and 204 may contain the information about the expected number of send and received emails, voice calls, and/or instant messages in the next hour, and/or the expected number of files, movies and/or music downloads in the next 24 hours (given the current and/or recent context of activities and/or conditions). Furthermore, profiles 202 and 204 may contain information about the properties of emails, calls, instant messages, games, web sites/pages, files, movies and/or songs, such as their size/duration, their rate of arrival/invocation, and so forth.

Profiles 202 and 204 may be established by observing and extrapolating the previous behavior of the user. The profiles may be unconditional or conditional on time, location, mobility pattern, or local or global events. For example, the user may be interested to receive an email alert any time when a subset of stocks or managed funds changed their value by more than a specified amount.

Recommendations 206 may comprise one or more operational recommendations for the wireless devices. Recommendations 206 may be mainly related to the resource required to execute a particular task and how they may be optimized for various objectives. Recommendations 206 may be provided by other users who have already conducted the same or similar tasks executions. For example, recommendations 206 may comprise one or more display resolution recommendations (depending on the items or media type of the items to be displayed) for the wireless device, one or more modulation recommendations (depending on the items, media type of the items to be transmitted and/or network condition) for the wireless device, one or more error correction code recommendations (depending on integrity needs) for the wireless device, and one or more packet size recommendations for communication for the wireless device (depending on the items, media type of the items to be transmitted and/or network condition).

Performance models (or simply model) 208 may comprise performance information about the wireless device, its software, operational conditions and the environment. For example, models 208 may contain information about the quality of the links at a particular location in terms of the signal-to-noise ratio, reception rate, interference, and current and expected traffic congestion. Models 208 may also comprise temperature and/or energy consumption of the wireless device under certain operating conditions. In various embodiments, models 208 may be constructed, based at least in part on measurements obtained for the device under the various operating and/or environmental conditions.

Current tasks and system status 210 may comprise information about the current tasks, their resource consumption, in terms of e.g. permanent (e.g. storage), perishable (computing cycles), or renewable (e.g. energy) resources. Current tasks and system status 210 may comprise current latency of each task, the available energy, the temperature of a subset of the components, ambient light and so forth.

The resource requirement of the predicted future task 214 may comprise e.g. its processor cycle requirements, its caching resource requirements, its transmit/receive requirements, and/or other execution requirements.

Continuing to refer to FIG. 2, in various embodiments, predictor 212 may be configured to provide short term higher accuracy as well as longer terms low accuracy predictions 214. Predictor 212 may employ simulation and/or Monte Carlo method. Predictions 214 may be in turn may be used by optimizer/analyzer 216 to optimize and manage resource allocation and protocol and policy selections. In various embodiments, as described earlier, optimizer/analyzer 216 based at least in part on the predictions and their resource requirements, may generate a set of instructions for the operating system of the wireless device to guide the operating system in allocating and managing resource.

In various embodiments, optimizer/analyzer 216 may be configured to optimize a complex objective subject to a complex set of constraints in fast and effective way (to generate a set of instructions for a predicted task, or generate a consolidated/optimized set of instructions for a number of predicted tasks). In various embodiments, the optimization may alter the operational parameters, algorithms and/or protocols of the wireless device, in order to improve quality of service objective of the wireless device, such as life time maximization or improvement, or the optimization or improvement of the quality of service in terms of operational parameters such as used resolution and latency. In various embodiments, optimizer/analyzer 216 may assume the predictions 214 for the future tasks and their resource requirements to be correct. Therefore, in such a way, for these embodiments, the uncertainty may be reduced or eliminated. In various embodiments, in order to maximize or improve the effectiveness and the accuracy, optimizer/analyzer 216 may be configured to consider during optimization several likely future scenarios, and select the solution that performs best over many or all of the considered scenarios.

In various embodiments, optimizer/analyzer 216 may be configured to use engineering change paradigm to incrementally keep improving the available solution and adapting to changed requirements and available resources. In various embodiments, optimizer/analyzer 216 may be configured to use several variants of maximum likelihood, where optimizer/analyzer 216 may be configured to find the most likely parameter set-up that may be most likely to optimize the objective function for the most likely scenarios. In various embodiments, for multiple predicted tasks, optimizer/analyzer 216 may first respectively generate configuration instructions for the tasks, and then generate an optimize set of configuration instructions based on the respectively generated set of instructions for the tasks.

In various embodiments, the profile building and/or optimization may be performed either locally (on the wireless device) or at the remote computer. In various embodiments, the decision with respect to where each operation may be performed, may itself be handled using existing user profile for SLM to allocate the tasks in such a way that the energy consumption, latency, the accuracy, or other user specified objective function may be optimized. The actual interaction of the user profile-based SLM may be effectuated in several ways. For example, the SLM may exchange the information with modified operating system or operating system that is designed in such a way that they may interact with a SLM.

In various embodiments, user interface 220 may be provided to inform the user about some or all SLM aspects. In various embodiments, user interface 220 may be further configured to allow the user to overwrite either directly or using more generic specification any subset of the decision or the process.

Figure 3:
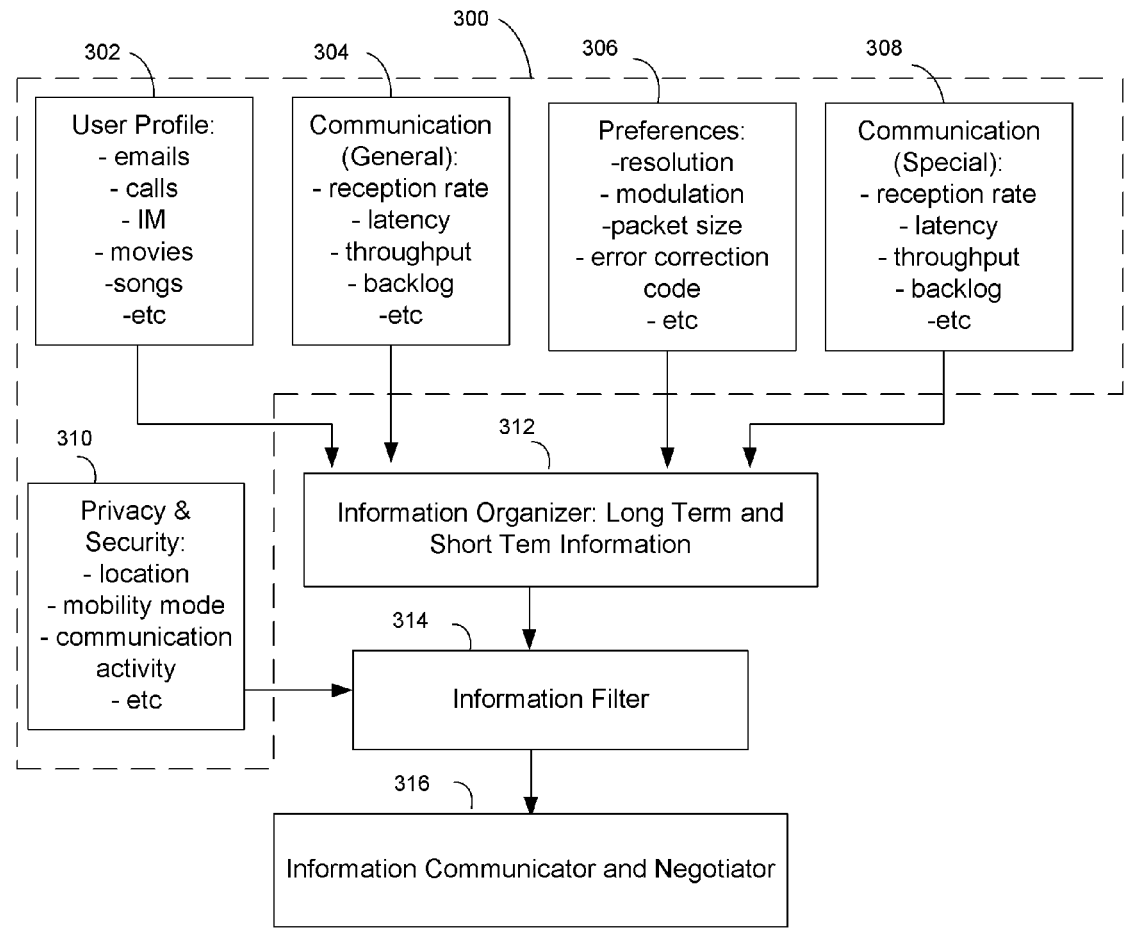
FIG. 3 schematically illustrates a user profile, and its use as a communication partner profile in further detail, in accordance with various embodiments of the present disclosure.

FIG. 3 schematically illustrates a user profile and its use as a communication partner profile in further details, in accordance with various embodiments of the present disclosure. As illustrated, user profile 300, in addition to profile information 302 related to the user's behavior with respect to email, voice calls, instant messages, games, files, web sites, movies and/or songs, user profile 300 may also comprise general communication attributes 304 with other parties in general, user preferences 306, specific communication attributes 308 with selected parties (e.g., dominant parties), and privacy and security attributes 310.

Communication attributes 304 and 308 may comprise information about reception rate, latency, throughput, backlog etc. for other communication parties in general or special parties in particular, respectively. User preferences 306 may comprise information about the user's communication preferences, e.g. display resolution (for email, instant messaging and so forth), modulation, packet size and/or error correction code. Privacy and security attributes 310 may comprise information about e.g. the user's location, mobility mode and communication activity.

For one or more embodiments, information organizer 312 may be provided and configured to organize the various information into both recent and long term information to permit the more relevant information be shared (subject to the user's privacy and security preferences) for communication and cooperation. For one or more embodiments, information filter 314 may be provided and configured to filter the organized information for release to a particular communication partner.

In various embodiment, information communicator and negotiator 316 may also be provided and configured, to decide when and how to communicate the releasable information to a communication partner or a group of communication partners. In various embodiments, information communicator and negotiator 316 may also be configured to negotiate with another party for the what, when and how to communicate the releasable information.

Figure 4:
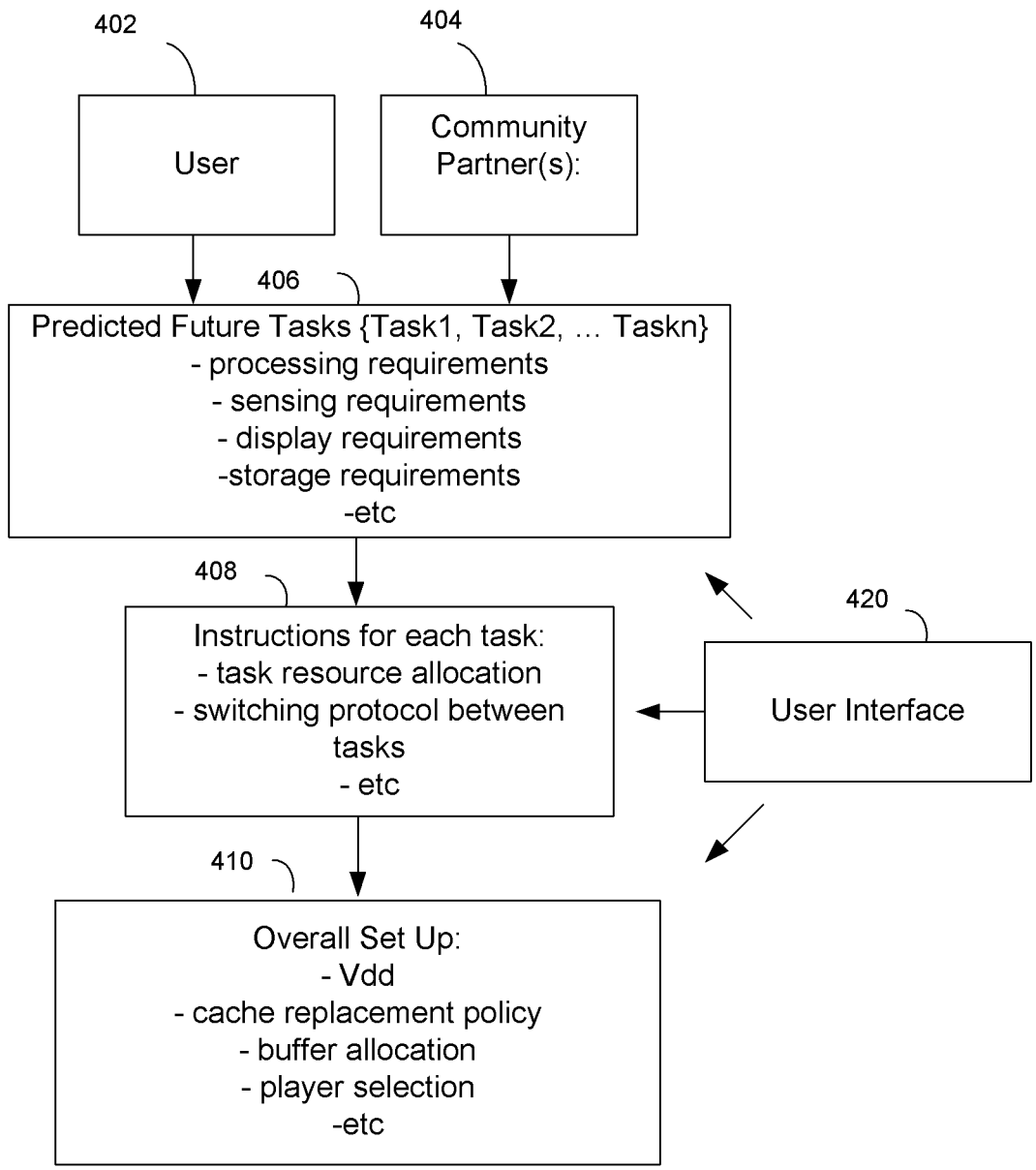
FIG. 4 schematically illustrates an example life-time optimization using user profile-based SLM, in accordance with various embodiments of the present disclosure.

FIG. 4 schematically illustrates an example life-time optimization using user profile-based SLM, in accordance with various embodiments of the present disclosure. The example illustrates how energy usage may be optimized for a wireless device, using user profile-based SLM. As illustrated, the user 402 and his/her communicating partners 404 provide information about the predicted future tasks 406. As described earlier, the predicted future tasks may include information about the required resources associated with the predicted future task. For the example, this information may be used to create a set of likely expect workloads for the wireless device.

For the example, the optimizer/analyzer consequently may conduct optimization at one or more of two levels: (i) at the individual task level; and (ii) at the interaction level. As illustrated and earlier described, the optimizer/analyzer first may generate instructions 408 for the wireless device to configure itself for each of the predicted future task. As illustrated and described earlier, the instructions 408 may comprise properties such as which processor to use, which software to employ, and so forth. Thereafter, the optimizer/analyzer may further analyze the various sets of instructions 408, and may search for improved or the best overall parameters and policies 410, for rapid and accurate evaluation; and stopping criteria. For one or more embodiments, on determination, the optimizer/analyzer may communicates the decision 410 to the operating system and communication hardware and system about the selected most or more beneficial parameter setting and selected algorithms, protocols, and policies, including e.g. the device voltage Vdd, buffer allocation, player selection, and so forth, where applicable.

As with the earlier described embodiments, user interface 420 may be provided to inform the user about some or all SLM aspects. In various embodiments, user interface 420 may be further configured to allow the user to overwrite either directly or using more generic specification any subset of the decision or the process.

Figure 5:
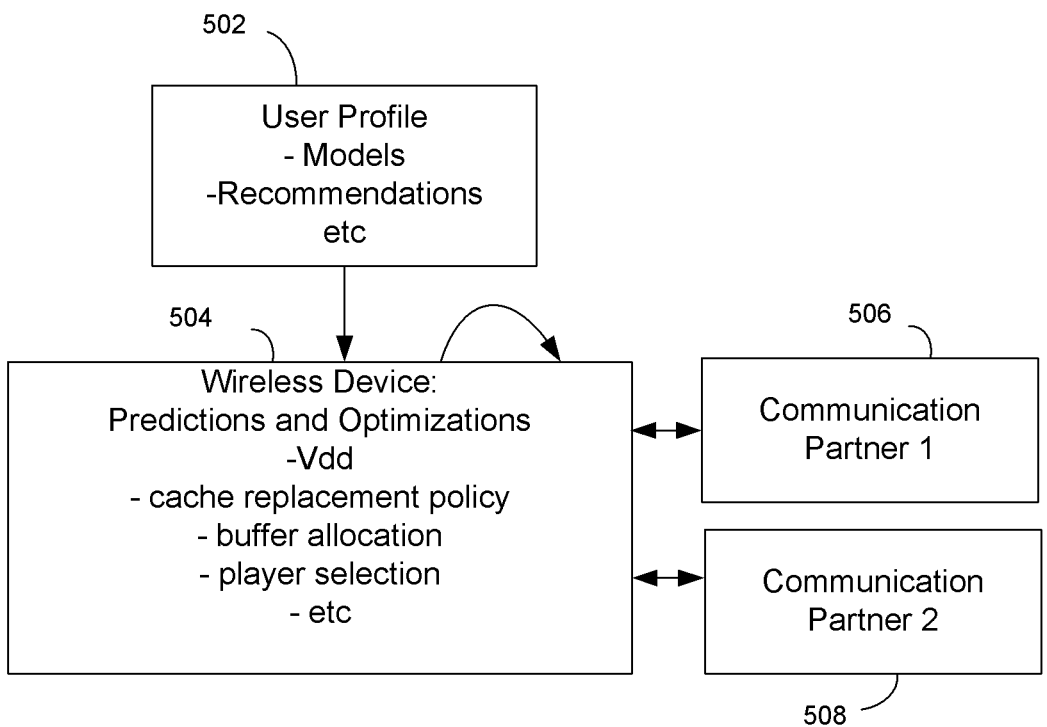
FIG. 5 schematically illustrates local user profile-based SLM, in accordance with various embodiments of the present disclosure.

FIG. 5 schematically illustrates local user profile-based SLM, in accordance with various embodiments of the present disclosure. For these embodiments, the pertinent wireless device 504 does some or all profiling and modeling associated with user profile 502, as well as predictions, and optimization itself. Some benefits may include self-sufficiency and reduction of communication cost. Note that the communication with other communication partners 506 and 508 may still be utilized at least for coordination about the communication set-up. For example, information about the communicating times, used modulation, synchronization code, used frequencies, and the error correction code may be coordinated between the communication partners 506 and 508. The main disadvantage may be that often more simplistic profiling, modeling, and optimization may be conducted in order to avoid the overloading of the local resources of the wireless device 504.

Figure 6:
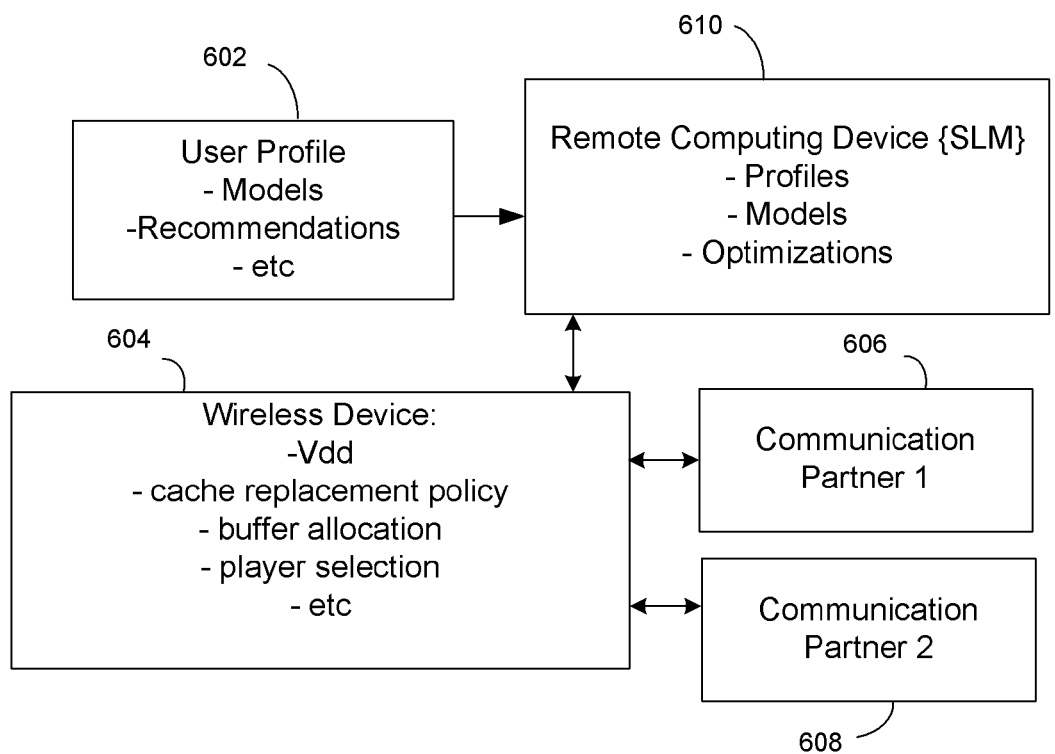
FIG. 6 schematically illustrates an alternative implementation of user profile-based SLM, in accordance with various embodiments of the present disclosure.

FIG. 6 schematically illustrates an alternative implementation of user profile-based SLM, in accordance with various embodiments of the present disclosure. For these embodiments, at least part of the profiling, modeling, predictions, and optimization for communication with communication partners 606 and 608 may be done at a remote computing device 610 (in lieu of the target wireless device 604), using user profile 602. One advantage for these embodiments may be that now each of profiling, modeling, predictions, and optimization may be done in more elaborated way and that coordination may be better achieved. However, some of the privacy may be reduced, the communication cost may be non-trivial and that the latency of decision may be increased.

In various embodiments, both local and remote user profile-based SLM may be used in such a way that the advantages may be combined and the limitations of each individual scheme may be reduced.

Figure 7:
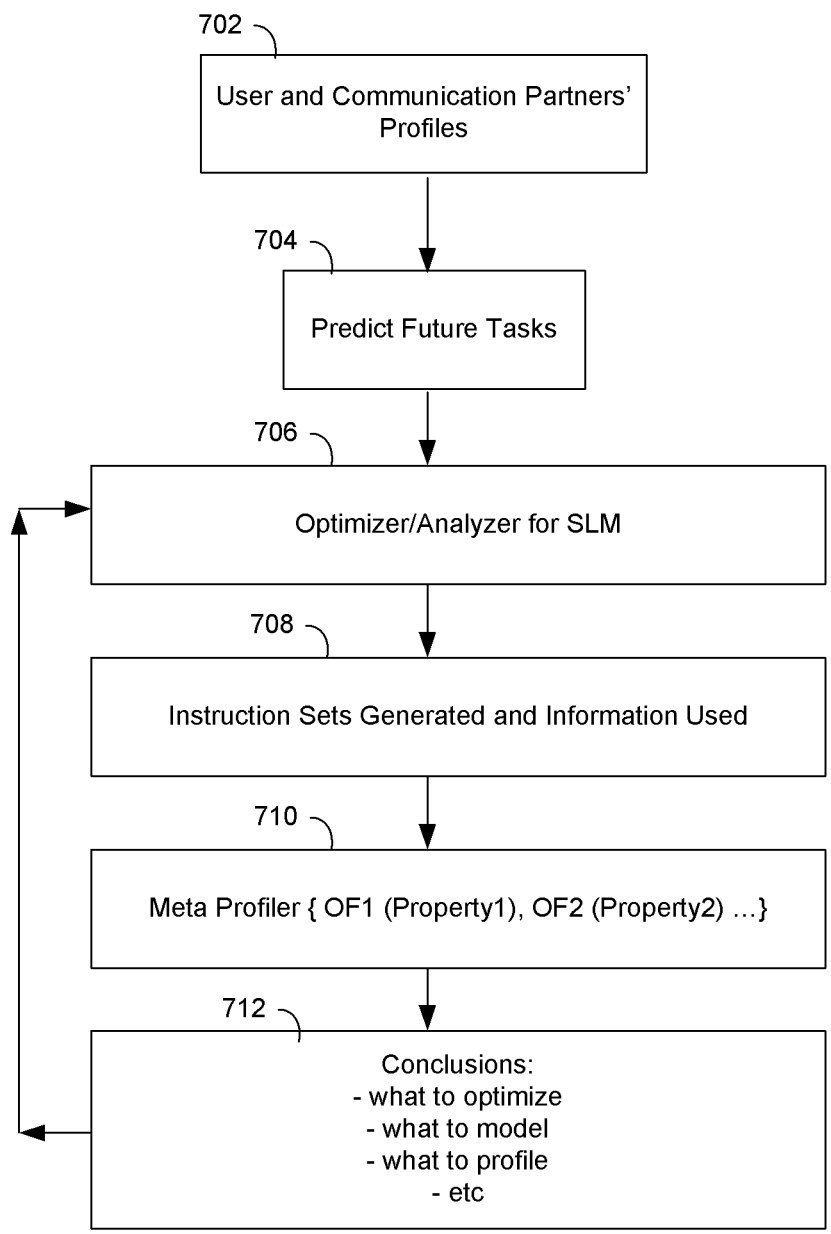
FIG. 7 schematically illustrates meta profiling to further improve the effectiveness of user profile-based SLM, in accordance with various embodiments of the present disclosure.

FIG. 7 schematically illustrates meta profiling to further improve the effectiveness of user profile-based SLM, in accordance with various embodiments of the present disclosure. As illustrated, for these embodiments, the instructions sets 708 generated by optimizer/analyzer 706 for the predicted future tasks 704, include meta data describing the information used in generating the instructions. For these embodiments, a meta profiler 710 may be further provided and configured to analyze the meta data included with the instruction sets 708 to determine which information was used by the various optimizer/analyzers 706 in generating the various instructions for various predicted future tasks, and their relevance. As earlier described, the various optimizer/analyzers 706 generate the instructions based at least in part on the predicted future tasks 704, which may be predicted based at least in part on the user and their communication partners profiles 702.

For these embodiments, meta profiler 710 analyzes these information and their relevance 708 and generates conclusions 712 for the various optimizers/analyzers 706 with respect what operational parameters should be optimized, what device performance characteristics should be modeled, what kind of user behavior attributes should be profiled, and so forth. Conclusions 712 may also include information identifying those particular operations that may be actually most practically important for a specific wireless device and/or a specific user.

As illustrated, the conclusions 712 may be feedback to the optimizers/analyzers 706 for optimizers/analyzers 706 to improve their optimization and analysis. This process of analyzing what information used in generating instructions, their relevance, and feeding back to the optimizer/analyzer 706 may be repeated periodically or continuously. Accordingly, the effectiveness of the user profile-based SLM approach may be further improved.

Figure 8:
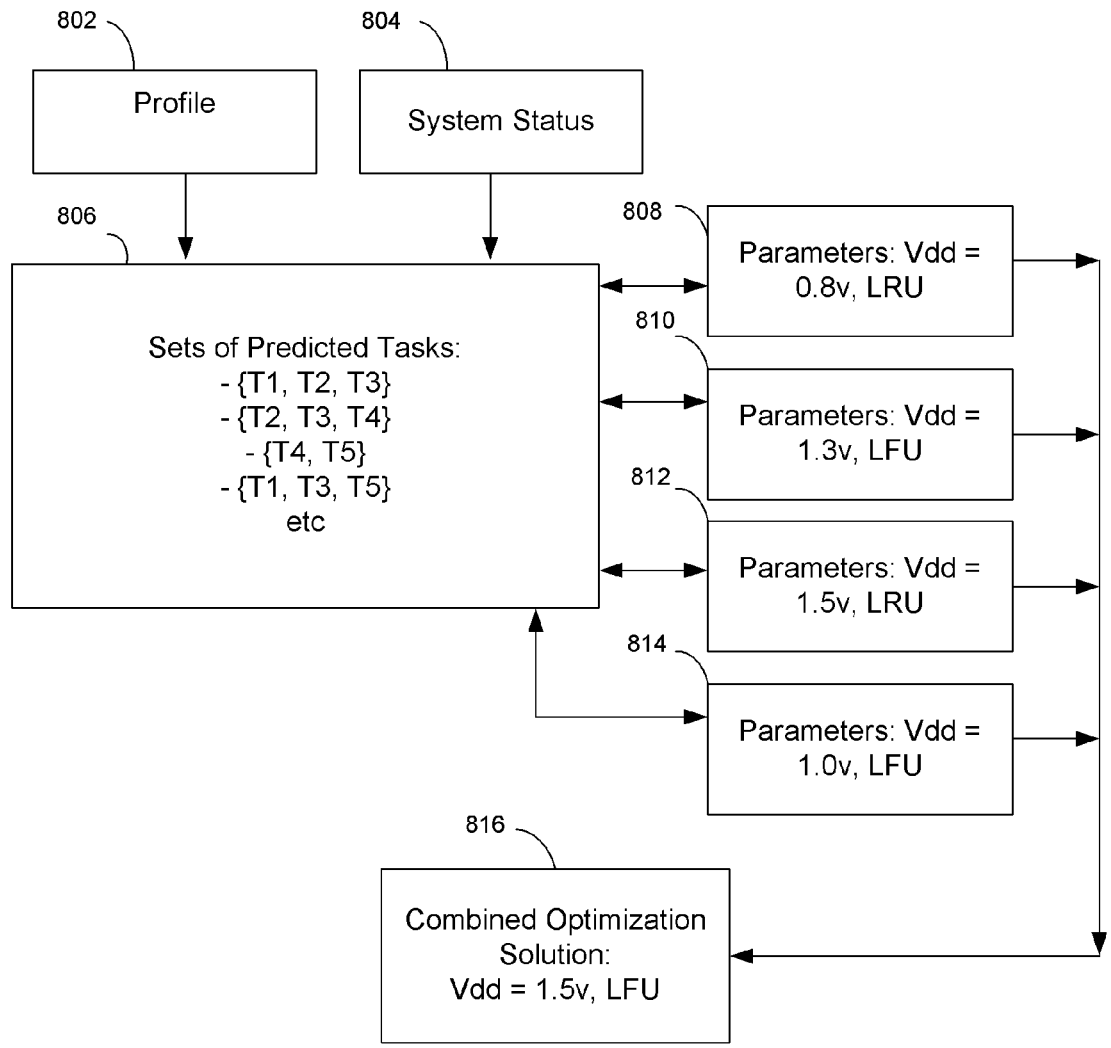
FIG. 8 schematically illustrates an example prediction and optimization using multiple maximum likelihood (ML) prediction, in accordance with various embodiments of the present disclosure.

FIG. 8 schematically illustrates an example prediction and optimization using multiple maximum likelihood (ML) predictions, in accordance with various embodiments of the present disclosure. In various embodiments, the optimizer/analyzer performs the ML SLM optimization in the following way. The predictor first may use the information from the profiles 802 and the system current status 804 to generate a number of highly likely sets 806 of tasks, e.g. a set having tasks {T1, T2, T3}, another set having tasks {T2, T3, T4} and so forth. For each set 806 of predicted tasks, the optimizer/analyzer may find the best selection of parameters 808-814. These selections of parameters 808-814 may provide information about likelihood that each of the decision may be most beneficial and to what extent. Next, the optimizer/analyzer may combine the information about likelihood using ML prediction to generate the combined optimization solution 816 that may be most likely optimize the pertinent quality of service objective function under the specified constraints. For various embodiments, if some task is actually not executed, the instructions associated with such tasks may be skipped in the determination of the combined optimization solution 816. On the other hand, if an unexpected task is invoked initially, the task may be performed using the set-up that is most beneficial without considering other tasks and the SLM process is invoked. In alternate embodiments, variations of these basic schemes may be executed.

Figure 9:
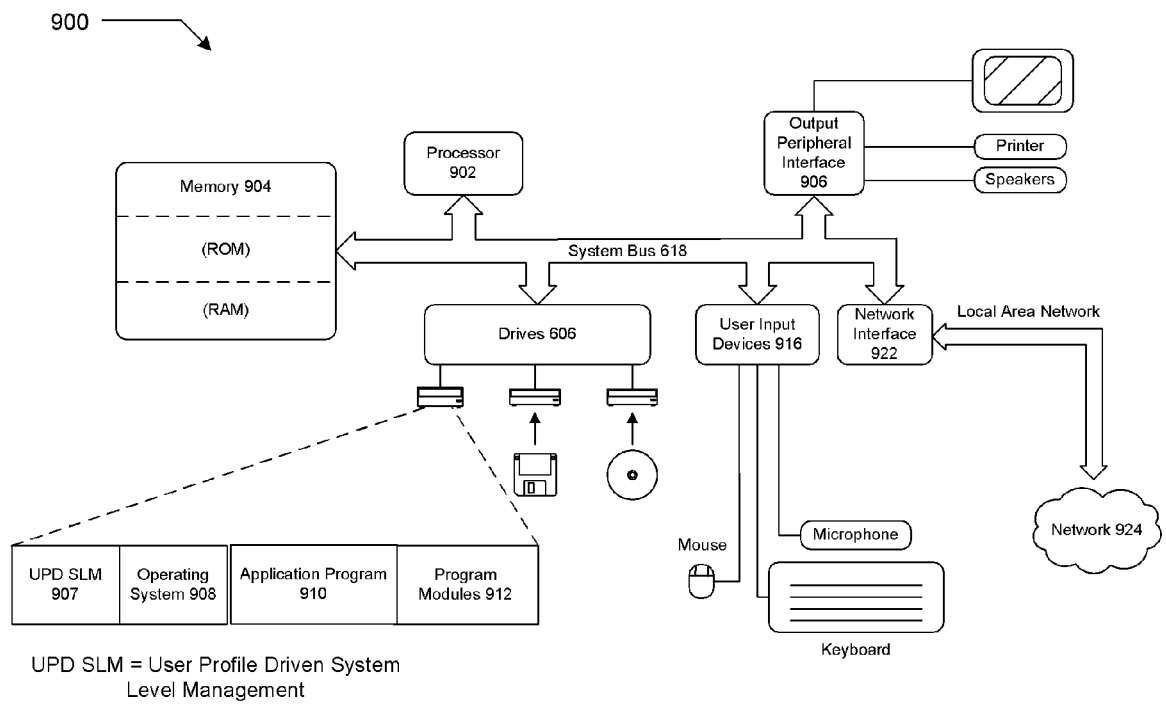
FIG. 9 illustrates an example computer suitable for practicing aspects of user profile-based SLM, in accordance with various embodiments of the present disclosure.

FIG. 9 illustrates an example computer suitable for practicing aspects of user profile-based SLM, in accordance with various embodiments of the present disclosure. FIG. 9 includes a computer 900, including a processor 902, memory 904 and one or more drives 906. The drives 906 and their associated computer storage media, provide storage of computer readable instructions, data structures, program modules and other data for the computer 900. The drives 906 may include an operating system 908, application programs 910 and program modules 912. For one or more embodiments drives 906 further include programming instructions 907 implementing various earlier described aspects of user profile-based SLM.

The computer 900 may further include user input devices 916 through which a user may enter commands and data. Input devices may include an electronic digitizer, a microphone, a keyboard and pointing device, commonly referred to as a mouse, trackball or touch pad. Other input devices may include a joystick, game pad, satellite dish, scanner, or the like.

These and other input devices may be coupled to processor 902 through a user input interface that is coupled to a system bus 918, but may be coupled by other interface and bus structures, such as a parallel port, game port or a universal serial bus (USB). Computers such as the computer 900 may also include other peripheral output devices such as speakers, which may be coupled through an output peripheral interface 920 or the like.

The computer 900 may operate in a networked environment using logical connections to one or more computers, such as a remote computer coupled to network interface 922. The remote computer may be a personal computer, a server, a router, a network PC, a peer device or other common network node, and may include many or all of the elements described above relative to the computer 900. Networking environments are commonplace in offices, enterprise-wide area networks (WAN), local area networks (LAN), intranets and the Internet. For example, in the subject matter of the present application, the computer 900 may comprise the source machine from which data is being migrated, and the remote computer may comprise the destination machine or vice versa. Note however, that source and destination machines need not be coupled by a network 924 or any other means, but instead, data may be migrated via any media capable of being written by the source platform and read by the destination platform or platforms. When used in a LAN or WLAN networking environment, the computer 900 is coupled to the LAN through a network interface 922 or an adapter. When used in a WAN networking environment, the computer 900 typically includes a modem or other means for establishing communications over the WAN, such as the Internet or network 924. It will be appreciated that other means of establishing a communications link between the computers may be used.

Articles of manufacture and/or systems may be employed to perform one or more methods as disclosed herein. FIG. 10 illustrates a block diagram of an example article of manufacture having a computer program product 1000 for user profile-based system level management (SLM), in accordance with various embodiments of the present disclosure. The computer program product 1000 may comprise computer readable storage medium 1032 and plurality of programming instructions 1034 stored in the computer readable storage medium 1032. In various ones of these embodiments, programming instructions 1034 may be adapted to program a processor of an apparatus, such that when the programming instructions are executed by the processor, the programming instructions enable the apparatus to perform one or more of receiving a user profile, a communication partner profile, a recommendation, a performance model and/or a current system status of a wireless device; predicting a future task including resource requirement for the wireless device based at least in part on the user profile and at least one of the received communication partner profile, recommendation, performance model and/or current system status; generating one or more instructions to configure the wireless device to perform the predicted future task based at least in part on the resource requirement and a quality of service requirement; and/or conveying or performing the generated instructions.

Computer readable storage medium 1032 may take a variety of forms including, but not limited to, non-volatile and persistent memory, such as, but not limited to, compact disc read-only memory (CDROM) and flash memory.

Claimed subject matter is not limited in scope to the particular implementations described herein. For example, some implementations may be in hardware, such as employed to operate on a device or combination of devices, for example, whereas other implementations may be in software and/or firmware. Likewise, although claimed subject matter is not limited in scope in this respect, some implementations may include one or more articles, such as a storage medium or storage media. This storage media, such as CD-ROMs, computer disks, flash memory, or the like, for example, may have instructions stored thereon, that, when executed by a system, such as a computer system, computing platform, or other system, for example, may result in execution of a processor in accordance with claimed subject matter, such as one of the implementations previously described, for example. As one possibility, a computing platform may include one or more processing units or processors, one or more input/output devices, such as a display, a keyboard and/or a mouse, and one or more memories, such as static random access memory, dynamic random access memory, flash memory, and/or a hard drive.

There is little distinction left between hardware and software implementations of aspects of systems; the use of hardware or software is generally (but not always, in that in certain contexts the choice between hardware and software may become significant) a design choice representing cost vs. efficiency tradeoffs. There are various vehicles by which processes and/or systems and/or other technologies described herein may be effected (e.g., hardware, software, and/or firmware), and that the favored vehicle may vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

In some embodiments, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, may be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link, etc.).

With respect to the use of substantially any plural and/or singular terms herein, those having skill in the art may translate from the plural to the singular and/or from the singular to the plural as is appropriate to the context and/or application. The various singular/plural permutations may be expressly set forth herein for sake of clarity.

Although certain example methods, apparatus, and articles of manufacture have been described herein, the scope of coverage of this disclosure is not limited thereto. On the contrary, this disclosure covers all methods, apparatus, and articles of manufacture fairly falling within the scope of the appended claims either literally or under the doctrine of equivalents. For example, although the above discloses example systems including, among other components, software or firmware executed on hardware, it should be noted that such systems are merely illustrative and should not be considered as limiting. In particular, it is contemplated that any or all of the disclosed hardware, software, and/or firmware components could be embodied exclusively in hardware, exclusively in software, exclusively in firmware or in some combination of hardware, software, and/or firmware.

What is claimed is:

1. A method for managing a wireless device based at least in part on a profile of a user of the wireless device comprising:
   receiving by a predictor operated by a computing device, the profile of the user, a profile of a communication partner of the user, an operational recommendation of the wireless device, a performance model of the wireless device, and a current state of the wireless device, wherein the current state of the wireless device comprises a current energy consumption state of the wireless device;
   predicting by the predictor a future task to be performed by the wireless device, and predicting a resource requirement for performing the future task, based at least in part on the user profile, the communication partner profile, the operational recommendation of the wireless device, the performance model of the wireless device, and the current energy consumption state of the wireless device; and
   generating by an optimizer/analyzer a set of instructions to configure the wireless device, based at least in part on the predicted future task and the resource requirement for performing the future task, and a quality of service requirement of the wireless device.

2. The method of claim 1, wherein the user profile comprises information about the user's emailing, voice calling, instant messaging, movie watching, or song listening behavior.

3. The method of claim 1, wherein the communication partner profile comprises information about the communication partner's emailing, voice calling, instant messaging, movie watching, or song listening behavior.

4. The method of claim 1, wherein receiving the operational recommendation of the wireless device, includes receiving a display resolution recommendation, a communication modulation recommendation, a communication packet size recommendation, or an error correction code recommendation.

5. The method of claim 1 wherein receiving the performance model of the wireless device includes receiving a signal-to-noise ratio model, a device temperature model, a communication reception rate model or a communication interference model.

6. The method of claim 1, wherein receiving the current state of the wireless device includes receiving information about a current task, or a current temperature.

7. The method of claim 1, wherein the resource requirement for performing the predicted future task comprises at least one of a processor cycle requirement, a caching resource requirement, and a transmit/receive resource requirement.

8. The method of claim 1, further comprising filtering by an information filter a communication partner's profile information base at least in part on the communication partner's privacy and/or security attributes to generate the communication partner's profile.

9. The method of claim 8, further comprising organizing by an information organizer the communication partner's profile information based at least in part on how recent the behavior information was recorded, prior to the filtering.

10. The method of claim 1, further comprising:
predicting by the predictor another future task to be performed by the wireless device, including resource requirement associated with the another future task, based at least in part on the user profile, the communication partner profile, the operational recommendation of the wireless device, the performance model of the wireless device, and the current state of the wireless device;
generating by the optimizer/analyzer an additional set of instructions to configure the wireless device for the another future task, based at least in part on the another predicted future task and the resource requirement associated with the another future task, and the quality of service requirement of the wireless device; and
generating by the optimizer/analyzer an optimal set of instructions for both tasks based at least in part on the respectively generated sets of instructions for the tasks.

11. An apparatus for managing a wireless device based at least in part on a profile of a user of the wireless device, the apparatus comprising:
a processor;
a predictor configured to be operated by the processor to predict a future task to be performed by the wireless device based at least in part on the profile, a profile of a communication partner of the user, an operational recommendation of the wireless device, a performance model of the wireless device, and a current state of the wireless device,
wherein the current state of the wireless device comprises a current energy consumption state of the wireless device,
wherein the predictor is further configured to be operated by the processor to predict a resource requirement for performing the future task, and
wherein the performance model of the wireless device comprises a device temperature model; and
an optimizer/analyzer operatively coupled to the predictor and configured to be operated by the processor to generate a plurality of instructions to configure the wireless device, based at least in part on the predicted future task and the resource requirement for performing the future task, and a quality of service requirement of the wireless device.

12. The apparatus of claim 11, wherein
the user profile comprises information about the user's emailing, voice calling, instant messaging, movie watching, or song listening behavior; and
the communication partner profile comprises information about the communication partner's emailing, voice calling, instant messaging, movie watching, or song listening behavior.

13. The apparatus of claim 11, wherein the resource requirement for performing the predicted future task comprises at least one of a processor cycle requirement, a caching resource requirement, or a transmit/receive resource requirement.

14. The apparatus of claim 11, further comprising an information filter configured to filter a user's profile information base at least in part on the user's privacy and security attributes prior to providing the user's profile as a communication partner profile to another user.

15. The apparatus of claim 14, further comprising an information organizer configured to organize the user profile information based at least in part on how recent the behavior information was recorded, prior to filtering by the information filter.

16. The apparatus of claim 11, wherein
the predictor is further configured to predict another future task to be performed by the wireless device, including a resource requirement associated with the another future task, based at least in part on the user profile, the communication partner profile, the operational recommendation of the wireless device, the performance model of the wireless device, and the current state of the wireless device; and
the optimizer/analyzer is further configured to generate additional sets of instructions to configure the wireless device for the another future task, based at least in part on the another predicted future task and the resource requirement associated with the another future task, and the quality of service requirement of the wireless device;
wherein the optimizer/analyzer is further configured to generate an optimal set of instructions for both tasks based at least in part on the respectively generated sets of instructions for the tasks.

17. The apparatus of claim 11, wherein the apparatus and the wireless device are one of the same device, and at least one of the predictor or the optimizer/analyzer is integrated with an operating system of the wireless device.

18. The apparatus of claim 11, wherein the apparatus is configured to be remotely disposed from, and coupled to the wireless device via a network, and the predictor and optimizer/analyzer forms a system level manager configured to manage a plurality of wireless devices.

19. An article of manufacture comprising:
a computer readable storage medium; and
a plurality of programming instructions stored in the computer readable storage medium, wherein the programming instructions are configured to program a processor of an apparatus, and wherein when the programming instructions are executed by the processor, the programming instructions enable the apparatus to:
predict a future task to be performed by a wireless device, and predict a resource requirement for performing the future task, based at least in part on a profile of a user of the wireless device, a profile of a communication partner of the user, an operational recommendation of the wireless device, a performance model of the wireless device, and a current state of the wireless device, wherein the operational recommendation of the wireless device comprises a display resolution recommendation; and generate a plurality of instructions to configure the wireless device, based at least in part on the predicted future task and the resource requirement for performing the future task, and a quality of service requirement of the wireless device.

20. The article of claim 19, wherein when executed, the programming instructions are further configured to enable the apparatus to receive the user profile, and the communication partner profile.

21. The article of claim 19, wherein
the user profile comprises information about the user's emailing, voice calling, instant messaging, movie watching, or song listening behavior; and
the communication partner profile comprises information about the communication partner's emailing, voice calling, instant messaging, movie watching, or song listening behavior.

22. The article of claim 19, wherein the resource requirement for performing the predicted future task comprises at least one of a processor cycle requirement, a caching resource requirement, or a transmit/receive resource requirement.

23. The article of claim 19, wherein when executed, the programming instructions enable the apparatus to filter a user profile information base at least in part on the user's privacy and security attributes before provide the user's profile as a communication partner profile to another user.

24. The article of claim 23, wherein when executed, the programming instructions enable the apparatus to organize the user's profile information based at least in part on how recent the behavior information was recorded, prior to the filtering.

25. The article of claim 19, wherein when executed, the programming instructions enable the apparatus to:
predict another future task to be performed by the wireless device, including a resource requirement associated with the another future task, based at least in part on the user profile, the communication partner profile, the operational recommendation of the wireless device, the performance model of the wireless device, and the current state of the wireless device;

generate an additional set of instructions to configure the wireless device for the another future task, based at least in part on the another predicted future task and the resource requirement associated with the another future task, and the quality of service requirement of the wireless device; and generate an optimal set of instructions for both tasks based at least in part on the respectively generated sets of instructions for the tasks.

26. The apparatus of claim 11,
wherein the operational recommendation comprises a display resolution recommendation, a communication modulation recommendation, a communication packet size recommendation, or an error correction code recommendation;
wherein the performance model comprises a signal-to-noise ratio model, a communication reception rate model, or a communication interference model; and
wherein the current state of the wireless device comprises information about a current task or a current temperature of the wireless device.

27. The article of claim 19,
wherein the operational recommendation comprises a communication modulation recommendation, a communication packet size recommendation, or an error correction code recommendation;
wherein the performance model comprises a signal-to-noise ratio model, a device temperature model, a communication reception rate model, or a communication interference model; and
wherein the current state of the wireless device comprises information about a current task, a current temperature, or a current energy consumption state of the wireless device.

* * * * *